United States Patent Office 3,461,185
Patented Aug. 12, 1969

3,461,185
HEAT ACTIVATED CURABLE ORGANOSILICON COMPOSITION
Eric D. Brown, Midland, Mich., assignor to Dow Corning Corporation, Midland, Mich., a corporation of Michigan
No Drawing. Filed Jan. 10, 1968, Ser. No. 696,706
Int. Cl. C08g *31/10, 31/22*
U.S. Cl. 260—825                      10 Claims

ABSTRACT OF THE DISCLOSURE

A curable organosilicon composition of an organosilicon polymer containing at least two monovalent hydrocarbon radicals having aliphatic unsaturation, an organosilicon compound having at least two silicon-bonded hydrogen atoms, a platinum catalyst and tetramethylguanidine carboxylate is stable at room temperatures but cures when heated. The organosilicon composition is curable to rubbers and resins.

---

This invention relates to a new heat activated curing system for organosilicon compounds.

Many articles of commerce based on organosilicon compounds are of the type that can be easily formed to a desired shape or applied to a desired area, after which the easily worked material is then cured to retain its desired configuration. For example, polysiloxane elastomers are normally supplied as formable materials ranging from thin pastes to stiff plastic dough-like materials. These materials are shaped by molding and extruding and the like, after which the article is converted to the rubbery state by curing, a process often called vulcanization when applied to an elastomer. The article then retains its desired shape, or if deformed, will seek to return to its vulcanized, or cured configuration. Similarly, polysiloxane resins, obtainable as fluids, fusible solids and solutions are also formed or applied and thereafter cured.

The curing methods employed for organosilicon compounds can be placed into two classes. The first are those that occur spontaneously at room temperature, exemplified by the curing systems such as described in U.S. Patents 2,833,742, 2,843,555, 2,902,467, 2,934,519 and 2,999,077. The second are those that require heat to activate the curing reaction such as organic peroxides, and the various sulfur-type cures more commonly used in connection with organic rubber. The instant composition is of the latter type, that is, it is heat activated. The system is similar to the curing system described in U.S. Patent 3,020,260, but differs therefrom in that the instant system is inactive at room temperature.

It is an object of the present invention to provide a novel useful heat activated curable organosilicon composition.

Another object is to provide a curing system that can be incorporated into an organosilicon compound that is inert at normal temperatures.

A further object is to provide a curing system that is not inhibited by air or components of air.

A further object is to provide a heat activated cure for organosilicon compounds that imparts good stability to the cured system.

These and other objects will be apparent from the following description.

This invention relates to a curable organosilicon composition comprising (1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms, (2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms, there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) is at least 4, (3) a platinum catalyst in an amount of at least 0.1 part by weight platinum per million parts by weight of the combined weights of (1) and (2), and (4) tetramethylguanidine carboxylate wherein the carboxylate has from 2 to 18 inclusive carbon atoms, the tetramethylguanidine carboxylate being present in an amount of from 0.01 to 4 moles of tetramethylguanidine carboxylate per mole of platinum.

Organosilicon compound (1) can be a resin, a fluid or a substantially non-flowing high polymer such as conventionally used in silicon rubber manufacture. Any monovalent hydrocarbon radical, halohydrocarbon radical or cyanoalkyl radical that can be used with organosilicon compounds as stated above is operable in component (1). Examples of monovalent hydrocarbon radicals that can be used include, for example, alkyl radicals such as methyl, ethyl, isopropyl, tert-butyl, octadecyl and miricyl; cycloalkyl radicals such as cyclopentyl and cyclohexyl; aralkyl radicals such as benzyl and 2-phenylethyl; aryl radicals such as phenyl, tolyl, xylyl, naphthyl, xenyl and anthracyl; and radicals containing aliphatic unsaturation such as vinyl, allyl, methallyl, ethynyl, butadienyl, cyclopentenyl, m-vinylphenyl and the like.

Any monovalent halohydrocarbon radical and cyanoalkyl radical can be used in (1), and include, for example, chloromethyl, 3,3,3-trifluoropropyl, 2,3-dibromocyclopentyl, iodophenyl, dichloronaphthyl, 2-cyanoethyl, 2-cyanopropyl and omega-cyanooctadecyl.

In component (1) there must be an average per molecule of at least two radicals containing aliphatic unsaturation. These radicals enter into the curing reaction discussed below. More than two said radicals can be present, but a minimum of two (average per molecule) is necessary to obtain a cure to a coherent solid. When the average number of aliphatically unsaturated radicals per molecule is more than two, a correspondingly tighter cure is obtained.

The monovalent organic radicals in (1) can be the same or different. In addition, the aliphatically unsaturated radicals can be the same or different. As well, organosilicon compound (1) can be a copolymer mixture of copolymers, mixtures of monomers and polymers, mixtures of monomers and copolymers and the like.

The remaining valences of the silicon atoms in organosilicon compound (1) are satisfied by divalent oxygen, divalent hydrocarbon radicals, divalent hydrocarbon ether radicals and divalent haloarylene radicals. Any one or more of the said divalent linkages can be present in component (1).

Examples of divalent radicals that can be used in component (1) include, for example, hydrocarbon radicals such as —CH$_2$—, —CH$_2$CH$_2$—, —(CH$_2$)$_{18}$—,

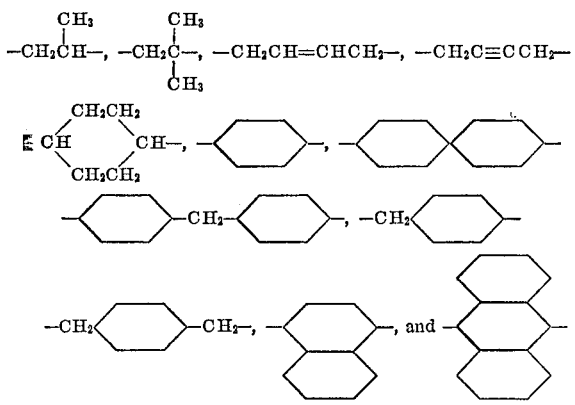

hydrocarbon ether radicals such as

—CH$_2$CH$_2$OCH$_2$CH$_2$—, —CH$_2$CH$_2$CH$_2$OCH$_2$CH$_2$— and

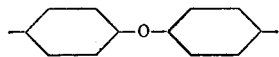

and haloarylene radicals such as

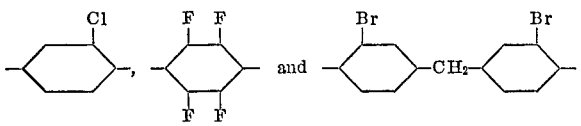

Any of the divalent linkages stated above can be present in component (1). However, where the average number of silicon atoms per molecule is greater than three, it is preferred when use of the finished product will include both extremely high and extremely low temperature exposure, that at least 50 percent of the divalent linkages be oxygen. This is not necessary, however, particularly when component (1) is a cyclic material.

Preparation of materials that can be component (1) are well known in the art. The monovalent radicals can be attached for instance, by either the so-called "direct process," or via Grignard reactions, or in some cases by a pseudo Friedel-Crafts reaction. Other reactions normally used to introduce organic radicals can, of course, be also used. Silicon-bonded oxygen is introduced by hydrolysis of a hydrolyzable group on silicon (such as halogen, alkoxy or acyloxy) as well known in the art. Divalent organic radicals can be introduced via Wurtz-type synthesis, Grignard, direct process, etc. The preparations of compounds suitable for use as component (1) are well known in the art and need not be recited herein.

Organosilicon compound (2) can be any organosilicon compound having silicon bonded hydrogen atoms. It can contain two or more silicon-bonded hydrogen atoms per molecule and in addition an average of up to two monovalent radicals per silicon atom as above set forth. These can include, for example, alkyl radicals such as methyl, ethyl, isopropyl, tert-amyl, octadecyl and myricyl; cycloalkyl radicals such as cyclopentyl and cyclohexyl; aralkyl radicals such as benzyl, β-phenylethyl and xylyl; and aryl radicals such as phenyl, tolyl, xenyl, naphthyl and anthracyl. In addition, monovalent halohydrocarbon radicals such as chloromethyl, 3,3,3-trifluoropropyl, α,α,α-trifluorotolyl, bromophenyl and 2,3-dibromocyclopentyl can be present in component (2). Also, cyanoalkyl radicals such as cyanoethyl and cyanobutyl can also be present. The organic radicals can be alike or different. Component (2) can be a homopolymer, a copolymer, a monomer, or mixture of two or more of the foregoing, provided only that each is free of aliphatic unsaturation and each contain an average per molecule of at least two silicon-bonded hydrogen atoms.

The remaining valences of the silicon atoms of component (2) are satisfied from divalent oxygen, divalent hydrocarbon radicals free of aliphatic unsaturation (e.g. —CH$_2$—, —(CH$_2$)$_{18}$—, —CH$_2$CH(CH$_3$)—,

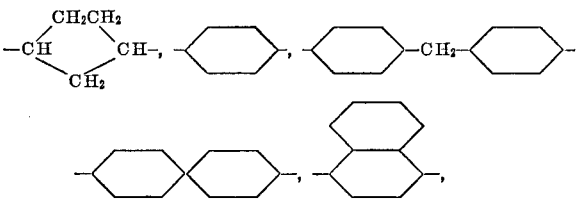

etc.), divalent hydrocarbon ether radicals free of aliphatic unsaturation (e.g. —CH$_2$CH$_2$OCH$_2$CH$_2$—,

—CH$_2$CH$_2$CH$_2$OCH$_2$CH$_2$—

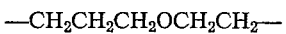

etc.), and divalent haloarylene radicals (e.g.

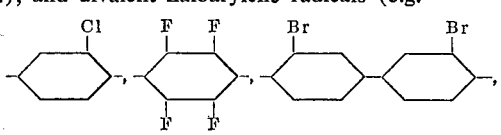

etc.). Any one or more of the above said divalent linkages can be present in component (2). As with component (1), when the average number of silicon atoms per molecule of (2) is greater than three it is preferred that at least 50 percent of the above divalent linkages be oxygen. This is not necessary, however, especially when component (2) is a cyclic material.

Preparation of materials that come within the definition of component (2) are well known in the art, and many examples of such materials are available commercially. Thus, recitation of methods of manufacture of these materials would be redundant herein.

The selection of components (1) and (2) is somewhat inter-related. When the average number of aliphatically unsaturated groups per molecule in component (1) is 2.0, a component (2) should be selected wherein the average number of silicon-bonded hydrogen atoms per molecule is at least 2.0, so that the total of these just defined quantities is at least 4. The analogous is true when the chosen component (2) contains 2.0 (average) silicon-bonded hydrogen atoms per molecule. When either component has the defined quantity greater than 2.0, selection of the other component on this basis is irrelevant. It should be understood, of course, that the higher the sum of these quantities, the more highly crosslinked can be the cured composition.

The molar ratio of aliphatic unsaturated radicals in (1) to the silicon-bonded hydrogen atoms in (2) can in some cases be an important consideration. Where it is important, the ratio of these two should be preferably between 0.67 and 1.5. However, there are many instances wherein a balance of these two quantities is unimportant. For example, if a component (1) has, say, an average of six aliphatic unsaturated groups per molecule, the use of equal molar amounts of silicon-bonded hydrogen atoms may well give a cure too tight for the desired end use. Thus, less than, sometimes much less than, the equal molar amount of SiH would be used to provide the desired degree of cure. However, when maximum stability is required it is desirable to match the molar quantities of silicon-bonded hydrogen atoms in (2) to the aliphatic unsaturated radicals in (1).

Platinum compound (3) can be any of the known forms, ranging from platinum as such or as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Additional platinum compounds which include, $PtCl_2[P(CH_2CH_2CH_3)_3]_2$, platinum bromides, a complex of platinous halide and an olefin such as ethylene, propylene, butylene, cyclohexane and styrene, $Pt(CH_3CN)_2Cl_2$, $[Pt(CH_3CN)_2(CH_3)_4]Cl_2$,

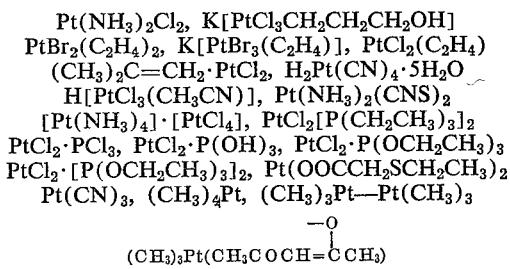

$PtCl_2CO$ and $PtBr_2CO$.

There should be at least 0.1 part by weight platinum per million parts by weight of the combined total weight of (1) and (2). However, since impurities in the system may easily poison this small quantity of catalyst, it is preferred to employ from 1 to 20 parts per million of platinum. A greater amount of the platinum does not affect the reaction, but does affect the requirement of component (4) below, and economic considerations suggest the lower amounts mentioned.

The key component in the present curable organosilicon composition is the tetramethylguanidine carboxylate. The tetramethylguanidine carboxylate can be any compound derived from a carboxylic acid having from 2 to 18 inclusive carbon atoms. Examples of carboxylic acids include acetic, propionic acid, butyric acid, valeric acid, caproic acid, enanthic acid, caprylic acid, pelargonic acid, hendecanoic acid, lauric acid, tridecanoic, myristic acid, pentadecanoic acid, palmitic acid, margaric acid, stearic acid, trichloroacetic acid, trifluoroacetic acid, 6-chlorolauric acid and the like. Examples of tetramethylguanidine carboxylates useful in this invention are tetramethylguanidine acetate, tetramethylguanidine propionate, tetramethylguanidine butyrate, tetramethylguanidine valerate, tetramethylguanidine caproate, tetramethylguanidine enanthate, tetramethylguanidine caprylate, tetramethylguanidine pelargonate, tetramethylguanidine caprate, tetramethylguanidine hendecanoate, tetramethylguanidine laurate, tetramethylguanidine tridecanoate, tetramethylguanidine myristate, tetramethylguanidine pentadecanoate, tetramethylguanidine palmitate, tetramethylguanidine trifluoroacetate, tetramethylguanidine margarate, and tetramethylguanidine stearate. The amount of tetramethylguanidine carboxylate required in the present invention ranges from 0.01 to 4 inclusive moles of tetramethylguanidine carboxylate per mole of platinum, preferably 0.01 to 2 moles of tetramethylguanidine carboxylate per mole of platinum. Amounts of tetramethylguanidine carboxylate less than 0.01 mole per mole of platinum do not retard the rate of cure at room temperature to be useful and amounts of tetramethylguanidine carboxylate greater than 4 moles per mole of platinum not only retard the rate of cure at room temperature, but also interfere with the curing at higher temperatures, such as at 150° C. Amounts of tetramethylguanidine carboxylate in the range of 0.01 to 0.1 mole per mole of platinum will effectively retard the rate of cure at room temperature, however, they may not completely prevent curing. Amounts greater than 0.1 mole tetramethylguanidine carboxylate per mole of platinum will effectively inhibit the cure of the organosilicon composition at room temperature but the organosilicon composition can be cured by heating above 70° C.

The addition of the tetramethylguanidine carboxylate to the present composition comprising (1), (2) and (3) slows down the rate of cure at room temperature or completely prevents a cure at room temperature over long periods of time such as greater than 3 months, but at temperatures in excess of 70° C. the inhibiting effect of the tetramethylguanidine carboxylate observed at room temperature disappears and a normal curing rate is realized. The cure of the present composition can be retarded at room temperature for short periods of time or for very long periods of time by the proper amount of tetramethylguanidine carboxylate. No exact amount of tetramethylguanidine carboxylate can be suggested to give a specified storage life at room temperature. The rate of cure at temperatures up to 60° C. will depend upon the ratio of tetramethylguanidine carboxylate to platinum, the form of the platinum catalyst, the nature and amounts of ingredients (1) and (2) and the presence or absence of other nonessential ingredients. Tetramethylguanidine carboxylate added in amounts on the lower end of the 0.01 to 4 moles per mole of platinum provide increased pot life in all systems but do not fully retard the reaction at room temperature (up to about 60° C.) and on the higher end of the range they provide completely inhibited cures in all systems at room temperature (up to about 60° C.). However, some systems are completly inhibited at room temperature at 0.1 mole tetramethylguanidine carboxylate per mole of platinum while others may require 0.2, 0.3 or 0.5 mole of tetramethylguanidine carboxylate per mole of platinum to completely inhibit the system at room temperature. Also some systems are not completely inhibited at room temperature when 0.1, 0.2, 0.3 or 0.5 mole of tetramethylguanidine carboxylate per mole of platinum is added. The amount of tetramethylguanidine carboxylate is therefore dependent upon the desired use, and the nature of the system. The skilled worker should therefore determine the optimum level of each system within the range of 0.01 to 4 moles of tetramethylguanidine carboxylate per mole of platinum.

As shown above, the use of tetramethylguanidine carboxylate can completely prevent room temperature cure of present organosilicon composition or the tetramethylguanidine carboxylate can be used to slow down the rate of cure at room temperature. Slowing down the rate of cure at room temperature can be extremely useful such as wherein a particular combination of (1), (2) and (3) would cure in four hours at room temperature, the same combination with the proper amount of tetramethylguanidine carboxylate would require 24 hours to cure. This extra time before cure would allow the user a longer time to use the mixture for coating, dipping, etc., before any of the mixture cured. The inhibiting effect can be negated by heating the composition above 70° C. whereby the composition cures. Thus, the tetramethylguanidine carboxylate, which is the key ingredient of this invention, can be used to retard the room temperature cure or prevent the room temperature cure (infinite retardation) of a system which cures by the platinum catalyzed interaction of silicon bonded hydrogen atoms with unsaturated aliphatic radicals on silicon.

The components of this invention can be mixed in any order. While the addition of the platinum without the tetramethylguanidine carboxylate will cause the beginning of interaction of components (1) and (2), the extent of reaction in a few minutes time at ordinary temperatures is negligible, within which time the tetramethylguanidine carboxylate will normally have been added. In systems where even this small amount of interaction might be deleterious, the tetramethylguanidine carboxylate can be added before the platinum. One method of mixing is to premix components (1) and (3), premix components (2) and (4), and then combine these two premixtures. Another method is to add the tetramethylguanidine carboxylate to component (1) and (2) and then add (3). A preferred method of mixing the ingredients is to mix (3) and (4). The resulting mixture of (3) and (4) provides a suitable catalyst mixture which can be stored and also added to either (1) or (2) or a mixture of (1) and (2) without any disadvantages. However, a set order of addition of the ingredient is not necessary to the functioning of this curing system.

The system can be mixed just prior to use (contemplated cure) or can be mixed and stored for later use. In addition, one or more of the components can be omitted, provided only that when components (1), (2) and (3) are present, component (4) must also be present. In addition, the storage of a mixture of components (2) and (3) alone is not preferred, for should moisture be present or be introduced, an undesirable alternate reaction can occur. Thus, components (1), (2) and (4) can be stored together and component (3) added later, or (1), (3) and (4) to which (2) is added later, etc. Further, components (2), (3) and (4) can be conveniently stored together and added to component (1) when desired. Such a system is especially desirable in the silicone rubber field, wherein the various diorganopolysiloxane polymers each have essentially the same amount of aliphatic unsaturation, wherefore the addition of components (2), (3) and (4) as a premixture is quite feasible.

As stated earlier, with sufficient tetramethylguanidine carboxylate the curing system is stable; that is, it does not cause curing of the organosilicon composition, at ordinary temperatures. For instance, even at 49° C. (120° F.) a fluid composition corresponding to the instant invention with sufficient tetramethylguanidine carboxylate showed essentially no change in viscosity after 4 days. At 70° C., however, this same mixture was a vulcanized rubber after 24 hours, and at 150° C. it vulcanized within 10 minutes. Thus, the instant curing system is quite stable to about 50 to 60° C., well above ordinary temperatures.

The curing reaction is that of addition of an SiH of (2) to an unsaturated radical on silicon of (1). This is a well-known reaction, catalyzed by many other materials in addition to platinum. The addition of SiH to allyl on silicon serves to illustrate the reaction as follows:

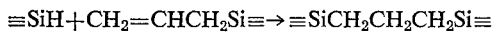

It is noteworthy that no by-products are formed in the curing reaction. Thus, it is not necessary to cure the system under pressure as is the case when a curing system produces by-products which are volatile. Further, it is unnecessary to carefully postbake the cured composition, as is necessary with most other heat activated curing systems now used in silicones. It is already well known that a curing system involving SiH and aliphatic unsaturated radicals need not be employed in a closed system. It is also well recognized that neither the extent of cure nor rate of cure are inhibited by air or components thereof.

In addition to the recited components, other materials can be present in a composition utilizing this curing catalyst system. Such materials as are ordinarily used in organosilicon compositions, such as fillers, (5), (carbon black, silica aerogels, silica soots, treated silicas, alumina, clays, metal oxides, metal carbonates, metal silicates, etc.), pigments to impart certain colors to the material, rubber additives such as compression set aids, plasticizers (both organosilicon and organic), etc., can be added to the instant composition. Materials that are known to poison platinum catalysts should, of course, be excluded but these are not normally included in organosilicon compounds designed to be cured by heat activated curing catalysts.

The instant composition can be used for any application requiring a resin or rubber where heat activated curing is possible. One will immediately recognize the tremendously wide variety of applications herein included. The instant curing system can be activated in closed or open systems, in thin or thick sections and under pressure and at atmospheric pressure with equal ease merely by the application of heat above about 70° C., there being complete freedom from the undesirable sponging associated with some curing systems when pressure is not used, and freedom from uncured surface, obtained particularly with organic peroxides, when the composition is cured in the open exposed to the atmosphere. Thus, advantages of this particular system include excellent thick-section cure, absence of air-inhibition, and therefore uniform cure throughout the sample. In addition, where desired, the system can serve to control (slow down) the rate of cure of a platinum catalyzed SiH-unsaturated aliphatic-on-silicon room temperature cure.

Particularly useful curable organosilicon compositions for many of the above uses are those having 45 to 75 inclusive weight percent of (1), 0.5 to 10 inclusive weight percent of (2), 20 to 50 inclusive weight percent of a filler (5), where the weight percentages are based on the combined weights of (1), (2) and (5), and the described amounts of platinum catalyst and tetramethylguanidine carboxylate.

The following examples are illustrative only and should not be construed as limiting the invention which is properly delineated in the appended claims.

Example 1

Four organosilicon compositions were prepared by mixing 100 grams of a methylphenylvinylsiloxy-endblocked polydimethylsiloxane having a viscosity of about 2000 cps. at 25° C., 1 gram of a trimethylsiloxy-endblocked polymethylhydrogensiloxane containing an average of about 34 siloxane units per molecule and 0.0058 g. of platinum added as chloroplatinic acid. The following table shows the amount of tetramethylguanidine acetate added to each sample and the results after exposure at room temperature and at 120° C.

| Sample | Tetramethyl guanidine acetate, g. | After 72 hrs. at room temperature | After 30 min. at 120° C. | After 24 hrs. at 120° C. |
|---|---|---|---|---|
| A | None | Cured | | |
| B | 0.003 | Uncured | Gelling | Cured. |
| C | 0.006 | ___do___ | ___do___ | Do. |
| D | 0.012 | ___do___ | ___do___ | Do. |

Note.—The samples cured to a rubber.

Example 2

The mixture as described above was prepared as described in Example 1 using dimethylvinylsiloxy-endblocked poly-3,3,3-trifluoropropylmethylsiloxane having a viscosity of about 5000 cs. at 25° C. instead of the methylphenylvinylsiloxy - endblocked polydimethylsiloxane. When small amounts of tetramethylguanidine acetate were present the mixture would not cure at room temperature, however, when heated to 150° C. the mixture vulcanized to a rubber.

Example 3

When the following compositions are prepared by thoroughly mixing, the composition is stable at room temperature, but cures to a solid upon heating to 90° C.

(A)

45 parts by weight of a dimethylvinylsiloxy-endblocked dimethylpolysiloxane gum
50 parts by weight of a silica filler
5 parts by weight of a trimethylsiloxy-endblocked polymethylhydrogensiloxane fluid having a viscosity of 60 cs. at 25° C.
0.0001 part by weight of platinum added as $H_2Pt(CN)_4 \cdot 5H_2O$, and
0.00013 part by weight of tetramethylguanidine caprylate.

(B)

49.5 parts by weight of a siloxane polymer having:
    45 mol percent dimethylsiloxane units,
    2 mol percent monovinylsiloxane units,
    31 mol percent phenylmethylsiloxane units,
    20 mol percent benzylmethylsiloxane units and
    2 mol percent monomethylsiloxane units, 0.5 part by weight of a compound of the formula:

$$\begin{array}{c} \text{H} \qquad\qquad \text{H} \\ | \qquad\qquad | \\ \text{CH}_3\text{SiCH}_3 \quad \text{CH}_3\text{SiCH}_3 \\ | \qquad\qquad | \\ \text{O} \quad \text{H} \quad \text{O} \\ | \quad | \quad | \\ \text{CH}_3\text{SiOSi—O—SiCH}_3 \\ | \quad | \quad | \\ \text{H} \quad \text{O} \quad \text{H} \\ | \\ \text{CH}_3\text{SiCH}_3 \\ | \\ \text{H} \end{array}$$

40 parts by weight of a fume silica,
10 parts by weight of finely divided quartz,
0.00025 part by weight platinum added as $PT(NH_3)_2Cl_2$, and
0.001 part by weight of tetramethylguanidine butyrate.

(C)

75 parts by weight of a hydroxyl-endblocked polydimethylsiloxane gum containing 0.2 mol percent methylvinylsiloxane units,
5 parts by weight of a tetramethyldihydrogendisiloxane,
20 parts by weight of a silica treated with trimethylsiloxy groups,
0.0008 part by weight platinum added as $PtCl_2(C_2H_4)$, and
0.003 part by weight of tetramethylguanidine stearate.

(D)

60 parts by weight of a dimethylvinylsiloxy-endblocked polydiorganosiloxane having:
    60 mol percent dimethylsiloxane units,
    35 mol percent cyclohexylmethylsiloxane units,
    4 mol percent diphenylsiloxane units and
    1 mol percent phenylvinylsiloxane units and having a viscosity of 50,000 cs. at 25° C.,
30 parts by weight of a fume silica,
10 parts by weight of a polymer of the average formula:

$(CH_3)_3SiO[(CH_3)_2SiO]_{62}[(CH_3)HSiO]_8Si(CH_3)_3$ 0.001 part by weight of platinum added as chloroplatinic acid, and
0.00015 part by weight of tetramethylguanidine henedecanoate.

(E)

50 parts by weight of a dimethylvinylsiloxy-endblocked polydimethylsiloxane having a viscosity of 100 cs. at 25° C.,
25 parts by weight of finely divided quartz,
6 parts by weight of $$\left(\bigcirc\!\!-\!\!\underset{\underset{\text{H}}{|}}{\overset{\overset{\text{CH}_3}{|}}{\text{SiO}}}\right)_4\!\text{Si}$$

4 parts by weight of fume silica,
0.0009 part by weight of platinum added as chloroplatinic acid, and
0.00087 part by weight of tetramethylguanidine propionate.

That which is claimed is:
1. A curable organosilicon composition comprising
(1) an organosilicon polymer having an average of from one to three groups per silicon atom selected from the group consisting of monovalent hydrocarbon radicals, aliphatic-unsaturation-free monovalent halohydrocarbon radicals, and cyanoalkyl radicals, there being an average per molecule of (1) of at least two monovalent hydrocarbon radicals containing aliphatic unsaturation, the remaining valences of the silicon atoms of the said organosilicon polymer being satisfied by selection from the group consisting of divalent oxygen atoms, divalent hydrocarbon radicals, divalent hydrocarbon ether radicals and divalent haloarylene radicals, said divalent radicals linking silicon atoms,
(2) an organosilicon compound containing silicon-bonded hydrogen atoms, there being in addition an average of up to two monovalent organic radicals per silicon atom selected from the group consisting of monovalent hydrocarbon radicals free of aliphatic unsaturation, monovalent halohydrdocarbon radicals free of aliphatic unsaturation and cyanoalkyl radicals, the remaining valences of the silicon atoms being satisfied by divalent radicals selected from the group consisting of divalent oxygen atoms, divalent hydrocarbon radicals free of aliphatic unsaturation, divalent hydrocarbon ether radicals free of aliphatic unsaturation and divalent haloarylene radicals, said divalent radicals linking silicon atoms there being an average of at least two silicon-bonded hydrogen atoms per molecule of (2), the sum of the average number of aliphatic unsaturated monovalent radicals per molecule of (1) and the average number of silicon-bonded hydrogen atoms per molecule of (2) being at least 4,
(3) a platinum catalyst in an amount of at least 0.1 part by weight platinum per million parts by weight of the combined weights of (1) and (2), and
(4) tetramethylguanidine carboxylate wherein the carboxylate has from 2 to 18 inclusive carbon atoms, the tetramethylguanidine carboxylate being present in an amount of from 0.01 to 4 inclusive moles of tetramethylguanidine carboxylate per mole of platinum.

2. The curable organosilicon composition according to claim 1 where (1) is a triorganosiloxy-endblocked polydiorganosiloxane having a viscosity of at least 100 cs. at 25° C.

3. The curable organosilicon composition according to claim 2 wherein the organic radicals of (1) are methyl and vinyl.

4. The curable organosilicon composition according to claim 2 wherein the organic radicals of (1) are methyl, phenyl and vinyl.

5. The curable organosilicon composition according to claim 2 wherein the organic radicals of (1) are methyl, 3,3,3-trifluoropropyl and vinyl.

6. The curable organosilicon composition according to claim 1 wherein the tetramethylguanidine carboxylate is present in an amount of from 0.01 to 2 moles of tetramethylguanidine carboxylate per mole of platinum.

7. The curable organosilicon composition according to claim 2 wherein the tetramethylguanidine carboxylate is present in an amount of from 0.01 to 2 moles of tetramethylguanidine carboxylate per mole of platinum.

8. The curable organosilicon composition according to claim 7 wherein the organic radicals of (1) are methyl and vinyl, the platinum is present as chloroplatinic acid and the tetramethylguanidine carboxylate is tetramethylguanidine acetate.

9. The curable organosilicon composition according to claim 7 wherein the organic radicals of (1) are methyl, 3,3,3-trifluoropropyl and vinyl, the platinum is present as chloroplatinic acid and the tetramethylguanidine carboxylate is tetramethylguanidine acetate.

10. The curable organosilicon composition according to claim 1 wherein the tetramethylguanidine carboxylate is tetramethylguanidine acetate.

References Cited

UNITED STATES PATENTS

| | | | |
|---|---|---|---|
| 3,188,299 | 6/1965 | Chalk | 260—46.5 |
| 3,192,181 | 6/1965 | Moore | 260—46.5 |
| 3,284,406 | 11/1966 | Nelson | 260—46.5 |
| 3,313,773 | 4/1967 | Lamoreaux | 260—46.5 |
| 3,344,111 | 9/1967 | Chalk | 260—46.5 |

DONALD E. CZAJA, Primary Examiner.

M. I. MARQUIS, Assistant Examiner.

U.S. Cl. X.R.

260—18, 37, 46